United States Patent
Su et al.

(10) Patent No.: US 12,130,861 B1
(45) Date of Patent: Oct. 29, 2024

(54) SEARCHING CONTENT WITHIN A VIDEO FOR PLAY POINTS RELEVANT TO THE SEARCHED CONTENT TO RETURN IN COMPUTER ADDRESSABLE LINKS HAVING THE PLAY POINT

(71) Applicant: INTERNATIONAL BUSINESS MACHINES CORPORATION, Armonk, NY (US)

(72) Inventors: Jun Su, Beijing (CN); Yang Liang, Beijing (CN); Su Liu, Austin, TX (US); Shunguo Yan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/461,887

(22) Filed: Sep. 6, 2023

(51) Int. Cl.
*G06F 16/71* (2019.01)
*G06F 16/73* (2019.01)
*G06F 16/738* (2019.01)
*G06F 16/74* (2019.01)
*G06F 16/78* (2019.01)

(52) U.S. Cl.
CPC ............ *G06F 16/748* (2019.01); *G06F 16/71* (2019.01); *G06F 16/738* (2019.01); *G06F 16/7867* (2019.01)

(58) Field of Classification Search
None
See application file for complete search history.

(56) References Cited

U.S. PATENT DOCUMENTS

| | | | |
|---|---|---|---|
| 7,610,306 B2 | 10/2009 | Lin et al. | |
| 7,983,915 B2 | 7/2011 | Knight et al. | |
| 8,549,164 B2 | 10/2013 | Bae et al. | |
| 8,983,945 B1 * | 3/2015 | Xie | G06F 16/7867 |
| | | | 707/727 |
| 9,627,004 B1 * | 4/2017 | Varadarajan | G06F 16/7847 |
| 9,912,712 B2 | 3/2018 | McCoy et al. | |
| 10,372,758 B2 | 8/2019 | Berry et al. | |
| 11,234,059 B1 | 1/2022 | Ram et al. | |
| 11,853,536 B2 * | 12/2023 | Napolitano | G06F 16/489 |
| 2007/0011012 A1 | 1/2007 | Yurick et al. | |
| 2008/0005105 A1 * | 1/2008 | Lawler | G06F 16/432 |

(Continued)

FOREIGN PATENT DOCUMENTS

CN 111209439 A 5/2020

OTHER PUBLICATIONS

D. Shao, et al., "Find and Focus: Retrieve and Localize Video Events with Natural Language Queries," Computer Vision Foundation, ECCV 2018, 17 pp.

(Continued)

*Primary Examiner* — Son T Hoang
(74) *Attorney, Agent, or Firm* — KONRAD, RAYNES, DAVDA & VICTOR LLP; David W. Victor

(57) ABSTRACT

An index is provided of content at timestamps of frames in a video. A search request is received with search content. A determination is made of matching content in the index, associated with a timestamp, matching the search content. A computer addressable link to the timestamp in the index associated with the matching content is returned to the search request. Selection of the computer addressable link causes the video to play from the timestamp.

19 Claims, 7 Drawing Sheets

| Time Line | User ID | Browser ID | Search Engine ID | Keyword List | Social Media URL | Steam ID | MappedContent [Keyword][TimeStamp] | PlayPoint |
|---|---|---|---|---|---|---|---|---|
| Time-1 | NULL | NULL | NULL | NULL | NULL | NULL | NULL | NULL |
| Time-2 | Usr01 | BRWS001 | SE001 | MaaS360, "Device ID", IME | http://myoutube.com | MaaS001 | MappedContent [MaaS360, "Device ID", IME][49] | URL=http://myoutube.com /MaaS001?t=49 |
| Time-3 | Usr01 | BRWS001 | SE001 | Apple (Text Search) | https://xyzmovie.com | Move001 | MappedContent [Apple+APPLE+🎬] [144] | URL=https://xyzmovie.com /move001?t=144 |
| Time-4 | Usr01 | BRWS001 | SE001 | APPLE (Audio Search) | https://xyzmovie.com | Move001 | MappedContent [Apple+APPLE+🎬] [144] | URL=https://xyzmovie.com /move001?t=144 |
| Time-5 | Usr01 | BRWS001 | SE001 | 🎬 (Image Search) | https://xyzmovie.com | Move001 | MappedContent [Apple+APPLE+🎬] [144] | URL=https://xyzmovie.com /move001?t=144 |

(56) References Cited

U.S. PATENT DOCUMENTS

| | | | |
|---|---|---|---|
| 2008/0086688 A1* | 4/2008 | Chandratillake | G06F 16/738 |
| | | | 707/E17.028 |
| 2011/0081075 A1* | 4/2011 | Adcock | G06F 16/5846 |
| 2011/0099195 A1 | 4/2011 | Patwardhan et al. | |
| 2012/0323897 A1 | 12/2012 | Daher et al. | |
| 2015/0089368 A1 | 3/2015 | Lester et al. | |
| 2015/0310107 A1 | 10/2015 | Alhakimi | |
| 2020/0311123 A1* | 10/2020 | Ramachandra Iyer | |
| | | | G06F 16/483 |
| 2022/0342918 A1 | 10/2022 | Liu et al. | |
| 2023/0140125 A1* | 5/2023 | Glesinger | G06F 16/71 |

OTHER PUBLICATIONS

X. Sun, et ai., "VSRNet: End-to-end video segment retrieval with text query," ScienceDirect, Pattern Recognition, vol. 119, Nov. 2021, 6 pp.

A. Kishore, "How to Specify a Starting Point for YouTube Videos," online-tech-tips, 4pp., [online][retrieved Aug. 29, 2023] https://www.online-tech-tips.com/cool-websites/how-to-specify-a-starti . . . .

\* cited by examiner

Search Request

Index Entry

Relevant Play Point Information

| Time Line | User ID | Browser ID | Search Engine ID | Keyword List | Social Media URL | Steam ID | MappedContent [Keyword][TimeStamp] | PlayPoint |
|---|---|---|---|---|---|---|---|---|
| Time-1 | NULL | NULL | NULL | NULL | NULL | NULL | NULL | NULL |
| Time-2 | Usr01 | BRWS001 | SE001 | MaaS360, "Device ID", IME | http://myoutube.com | MaaS001 | MappedContent [MaaS360, "Device ID", IME][49] | URL=http://myoutube.com /MaaS001?t=49 |
| Time-3 | Usr01 | BRWS001 | SE001 | Apple (Text Search) | https://xyzmovie.com | Move001 | MappedContent [Apple+APPLE+ 🍎 ][144] | URL=https://xyzmovie.com /move001?t=144 |
| Time-4 | Usr01 | BRWS001 | SE001 | APPLE (Audio Search) | https://xyzmovie.com | Move001 | MappedContent [Apple+APPLE+ 🍎 ][144] | URL=https://xyzmovie.com /move001?t=144 |
| Time-5 | Usr01 | BRWS001 | SE001 | 🍎 (Image Search) | https://xyzmovie.com | Move001 | MappedContent [Apple+APPLE+ 🍎 ][144] | URL=https://xyzmovie.com /move001?t=144 |

FIG. 7

SEARCHING CONTENT WITHIN A VIDEO FOR PLAY POINTS RELEVANT TO THE SEARCHED CONTENT TO RETURN IN COMPUTER ADDRESSABLE LINKS HAVING THE PLAY POINT

BACKGROUND OF THE INVENTION

1. Field of the Invention

The present invention relates to a computer program product, system, and method for searching content within a video for play points relevant to the searched content to return in computer addressable links having the play point.

2. Description of the Related Art

Video streaming services provide user interfaces having a search function to search for videos having metadata matching a search criteria, such as movie title, key actors, etc. When the user selects a search result providing a link to the video having metadata matching the search criteria, the user may navigate through the video to reach a desired location.

YouTube® has a feature that allows a user to manually scroll to a desired play point in a video and then copy a video Uniform Resource Locator (URL) that has an embedded timestamp in the video where the user wants to begin play. Sharing this timestamp embedded URL with others allows users' selecting the timestamp embedded URL to play the video from the point of the timestamp. For instance, a person wanting to share a YouTube® link to a particular desired movie scene, would scroll to that point in the move, right click the mouse on the video area and select "copy video URL at current time" to generate a URL "https://youtu.be/[link code]?t=4555", where "t=4555" seconds references the embedded play point where the desired scene begins. (YOUTUBE is a registered trademark owned by Google LLC throughout the world).

SUMMARY

Provided are a computer program product, system, and method for searching content within a video for play points relevant to the searched content to return in computer addressable links having the play point. An index is provided of content at timestamps of frames in a video. A search request is received with search content. A determination is made of matching content in the index, associated with a timestamp, matching the search content. A computer addressable link to the timestamp in the index associated with the matching content is returned to the search request. Selection of the computer addressable link causes the video to play from the timestamp.

BRIEF DESCRIPTION OF THE DRAWINGS

FIG. 7 illustrates an embodiment of a relevant play point information table having relevant play point information of computer addressable links to timestamps in the video where content is rendered matching a search criteria.

DETAILED DESCRIPTION

Figure 1:
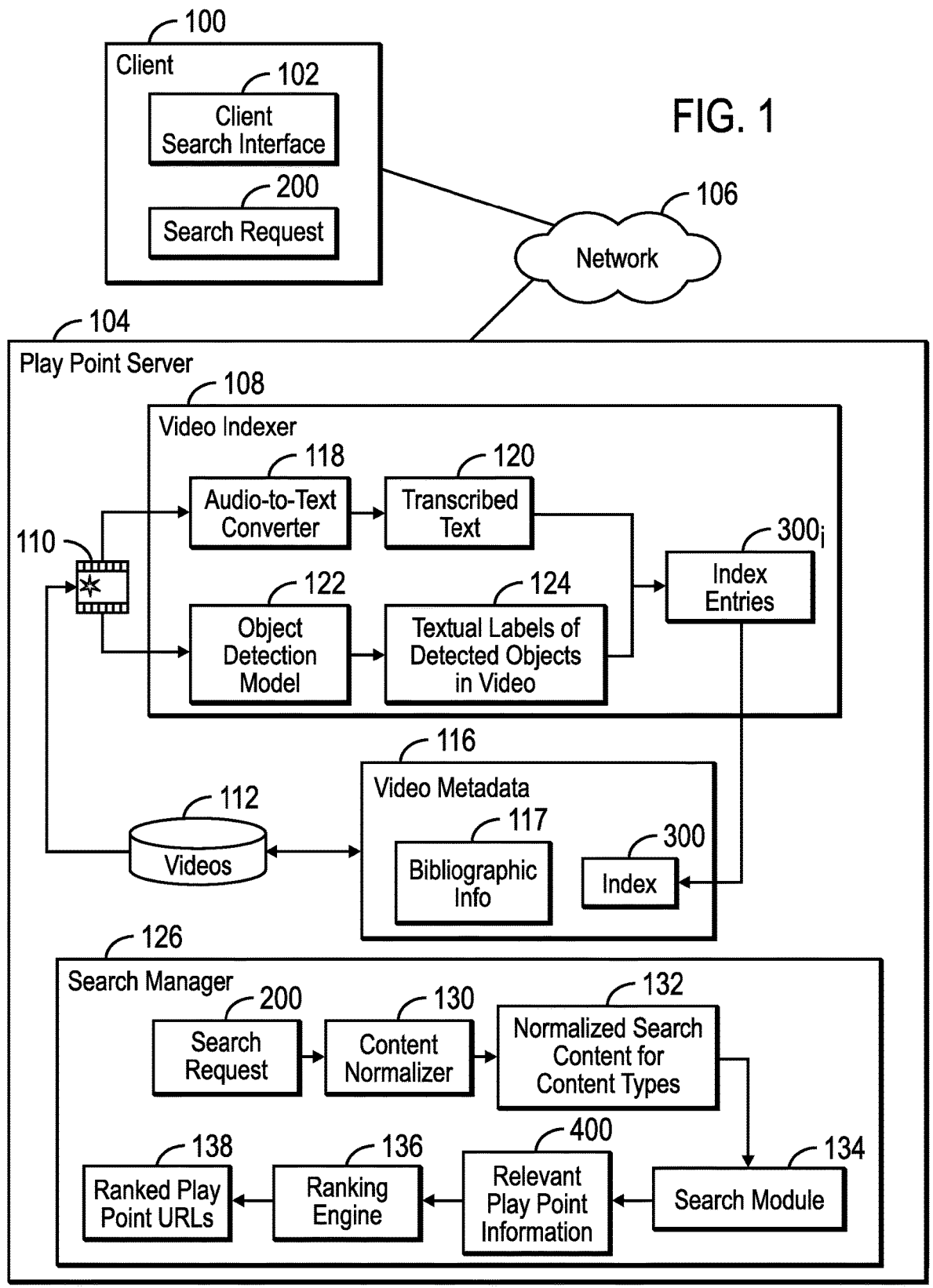
FIG. 1 illustrates a computing environment to index video content and search for content in the video.

In the current art, if a user searches for videos matching a search criteria, videos are returned having metadata, typically bibliographic information and tags, matching the search criteria. The returned video search results may not be useful if the metadata is insufficient because the actual content of the video is not searched. Further, the search result URL when selected starts playing the video from the beginning, not from a play point where the searched content is located.

Described embodiments provided improvements to computer search technology for searching video content by generating text descriptions of an audio stream in a video and objects depicted in the video to include in index entries for the video that indicate the timestamp where the audio and video content is rendered. This type of content driven indexing allows users to search for specific content within the video, to provide a far more robust search than just searching bibliographic information and tags for a video.

Further, described embodiments provide improvements to computer technology for ranking video search results by allowing a user to specify search ranking weights for different content types to weight the number of matching instances of a content type at a timestamp in the video to produce a rating for that timestamp having matching search content based on the weighted number of instances of different content types. These rankings are then used to rank the relevance of computer addressable links, e.g., URL links, to content in the video matching the search criteria at different timestamps in the video.

Described embodiments allow the user to search for content that may not be present in the video bibliographic information and tags, but comprises content located within the video frames themselves, such as an audio stream and images rendered in the video frames.

Described embodiments provide improvements to video searching technology by providing accuracy of relevant play point identification in the video. Described embodiments accurately identify the most relevant play point within a media stream based on user-searched keywords. Providing precise identification of a play point with the search result improves searching by providing users with the desired content from the desired moment. This is accomplished by embedding the identified relevant play points with a returned retrieval result. The returned computer addressable links with embedded play point timestamp causes the playback of the media at the link from the most relevant play point with respect to the search content.

Described embodiments provide robust content analysis by providing accurate indexing of the actual content in media streams, which is crucial for effective keyword matching and identifying relevant play points. This is accomplished by indexing the content of a media in different formats and then mapping the indexed content to the most correlated timestamp in the media.

Described embodiments further provide for handling multimodal content. Media streams often contain a combination of audio, video, and textual elements. Described embodiments account for multimodal content analysis to ensure comprehensive and accurate matching of user-searched keywords with relevant play points. This allows users to provide keywords in different types (text, audio, image/video) to retrieve contents of media files in the different formats at the most relevant play point.

FIG. 1 illustrates an embodiment of a network computing environment having a client computer 100 that includes a client search interface 102, such as a web browser, to send search requests 200 to a play point server 104 over a network 106 to retrieve computer addressable links, such as Uniform Resource Locator (URL) links, to a timestamp play point in a video having content matching search content in a search request 200. A user at the client 100 may select a URL link to a play point in the video to open the video to begin playing at the play point specified in the computer addressable link, e.g., URL, having content matching the search content.

The play point server 104 includes a video indexer 108 to index videos 110 in a video database 112 by generating index entries 300; of video content, such as audio and image content, in frames in the video at different timestamps. The index entries 300; may be added to an index 300, such as a posting list search index. Video metadata 116 may comprise biographical information and tags 117 on the videos 112, such as title, creators, actors, directors, producers, genre, etc.

The video indexer 108 may include an audio-to-text converter 118 to convert audio in a video 110 to transcribed text 120 to include in the index entries 300 indexed by timestamp where the audio occurs. The video indexer 108 further includes an object detection model 122, which may comprise a machine learning model, to detect images in the video 110 and generate textual labels of detected objects in videos 124, i.e., labels, of the detected images. The transcribed text 120 and textual descriptions of detected objects 124 may be included in index entries 300 for a timestamp in the video 110 at which the audio and video images were extracted and converted to text. The object detection model 122 may implement a You Only Look Once (YOLO) machine learning algorithm and other computer vision machine learning models to detect images in video and provide a description and label of the detected image.

The play point server 104 may include a search manager 126 to process a search request 200 from a client 100 to determine index entries 300; in the index 300 having content for content types matching search content for content types in the search request 200. The search manager 126 includes a content normalizer 130 to transform search content in a search request 200 in one format, such as audio, image, video, to a normalized search content 132, such as text, to use to search the text in the index entries 300 describing the different content types. The normalized search content 132 for the different content types in the search request 200 is sent to a search module 134 to search the index 300 for index entries 300; having content for content types matching search content for the content types in the search request 200. The search manager 126 generates relevant play point information 400 providing computer addressable links to timestamps in videos having the content matching content for content types in the search request 200. A ranking engine 136 may use weights in a search request 200 to apply to the matching content in the relevant play point information 400 to generate rankings of the computer addressable links, play point URLs 138, that upon selection opens the video into a video player in the client interface 102 to start playing at a timestamp at which the search content is rendered.

In described embodiments, the index entries 300 maintain text descriptions of audio and video content at timestamps in a video 110. However, in further embodiments, the index entries 300 may include content for content types other than text, such as images and audio at the timestamp. A search request 200 may include image and audio files to use to search the index 300 for entries 300; having an image or audio matching that in the image and audio file in the search request.

In described embodiments, the search module 134 would search for text descriptions of the different content types in the index entries 300. In a further embodiment, there may be a plurality of search modules 134 to search for different types of media, such as an audio searcher to receive a search audio snippet in an audio format and search the audio stream in a video for matching audio; an image searcher to receive a search image file and search the video for frames having objects matching the image in the received search image file; and a video searcher to receive a search video snippet in an audio format and search the video stream in a video for matching video. The video searcher may comprise a reverse video search engine, the image searcher may comprise a reverse image search engine, and an audio search engine to search audio in videos 112 for video streams that match a search audio file. Further the content normalizer 130 may convert search content, such as in text, image, audio, and video, to another format, such as text, image, audio or video, and then provide the normalized or converted format, such as text, image, audio or video, to a search module 134 that can search for content in the videos 112 in a format matching the normalized content, in text, image, audio or video.

Generally, program modules, such as the program components 102, 108, 118, 122, 126, 130, 134, and 136, among others, may comprise routines, programs, objects, components, logic, data structures, and so on that perform particular tasks or implement particular abstract data types.

The programs 102, 108, 118, 122, 126, 130, 134, and 136, among others, may comprise program code loaded into memory and executed by a processor. Alternatively, some or all of the functions of these components may be implemented in hardware devices, such as in Application Specific Integrated Circuits (ASICs), Field Programmable Gate Arrays (FPGAs) or executed by separate dedicated processors.

The functions described as performed by the program components 102, 108, 118, 122, 126, 130, 134, and 136, among others, may be implemented as program code in fewer program modules than shown or implemented as program code throughout a greater number of program modules than shown The client computer 100 may comprise a personal computing device, such as a laptop, desktop computer, tablet, smartphone, wearable computer, mixed reality display, virtual reality display, augmented reality display, etc. The play point server 104 may comprise one or more server class computing devices, or other suitable computing devices.

In FIG. 1, arrows are shown between components in the play point server 104. These arrows represent information flow to and from the program components.

The network 106 may comprise a Storage Area Network (SAN), Local Area Network (LAN), Intranet, the Internet, Wide Area Network (WAN), peer-to-peer network, wireless network, arbitrated loop network, etc.

Certain of the program components, such as the 118, 122, and 134 may use machine learning and deep learning algorithms, such as decision tree learning, association rule learning, neural network, inductive programming logic, support vector machines, Bayesian network, Recurrent Neural Networks (RNN), Feedforward Neural Networks, Convolutional Neural Networks (CNN), Deep Convolutional Neural Networks (DCNNs), Generative Adversarial Network (GAN), etc. For artificial neural network program implementations, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the output having specified confidence levels based on the input parameters. For instance, the input to the search module may comprise a type of content, such as text, image, audio, and video, and the search module 134 may output identifying locations in a video having the input content with confidence levels. The machine learning models 118, 122, and 134 may be trained to produce their output for product information and product recommendations, respectively, based on the inputs. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In an alternative embodiment, the components 118, 122, 134 may be implemented not as a machine learning model but implemented using a rules based system to determine the outputs from the inputs. The components 118, 122, 134 may further be implemented using an unsupervised machine learning module, or machine learning implemented in methods other than neural networks, such as multivariable linear regression models.

Figure 2:
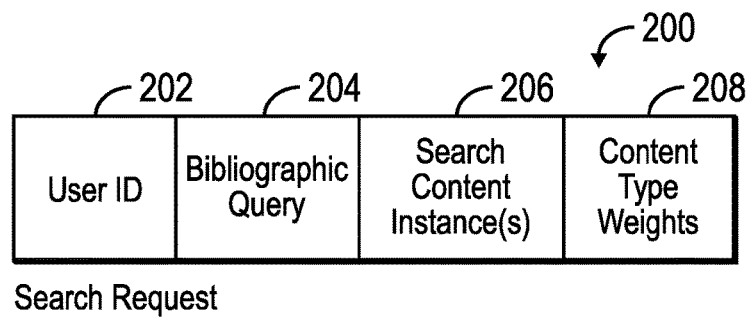
FIG. 2 illustrates an embodiment of a search request.

FIG. 2 illustrates an embodiment of a search request 200 generated by a client search interface 102, including a user identifier (ID) 202 of the user and/or user browser that submitted the search request 200; optional bibliographic query 204, including tags, to search for videos 112 having bibliographic information 117 matching the bibliographic query 204; one or more search content instances 206 including, for each provided content type, search content, such as keywords, an image, audio, video, and content type in the videos 112 to be searched; and content type weights 208 of weights to apply to matching search content in the search results to rank the search results.

Figure 3:
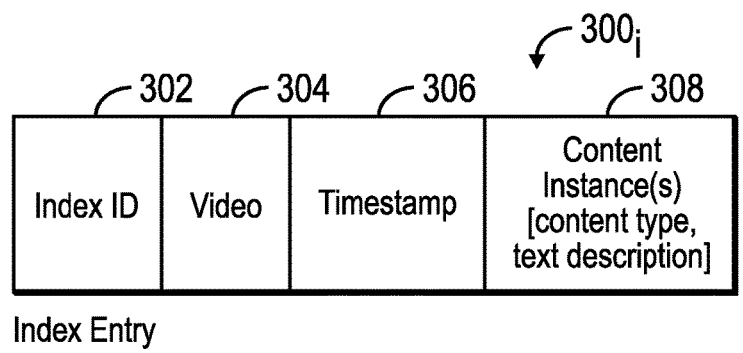
FIG. 3 illustrates an embodiment of an index entry.

FIG. 3 illustrates an embodiment of an index entry 300$_i$ generated by the video indexer 108, and includes an index ID 302 in the index 300; a location or pointer to a video 304 in the video database 112; a timestamp 306 in the video 304 having the indexed content instance 308 from the video. The content instance(s) 308 may comprise a content type from the video 304, e.g., audio, video, text, and a text description of the content 308 generated by the audio-to-text converter 118 or the object detection model 122.

Figure 4:
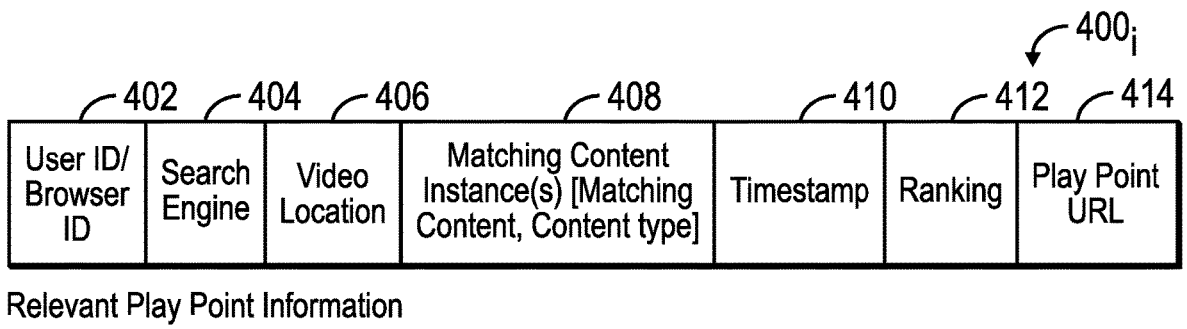
FIG. 4 illustrates an embodiment of relevant play point information.

FIG. 4 illustrates an embodiment of relevant play point information 400$_i$ having information from an index entry 300$_i$ having content instances 308 satisfying a search request 200, and includes: a user ID 402 or browser ID of the user; a search engine 404 used to locate the index entry satisfying the search request 200; the video location 406 or address of the video; one or more matching content instances 408 satisfying the search request 200, such as matching content, e.g., audio, video, text, for a content type, e.g., audio, video, text; a timestamp 410 in the video where the matching content instances 408 are rendered; a ranking 412 of the matching content calculated by the ranking engine 136 based on the weights 208 included in the search request 200; and a play point URL 414 comprising a computer addressable link or URL with the embedded timestamp 410 that when selected, by a user through the client 100 in a web browser or other viewing program, opens the video in a video player to begin playing from the timestamp 410 in the video 406.

Figure 5:
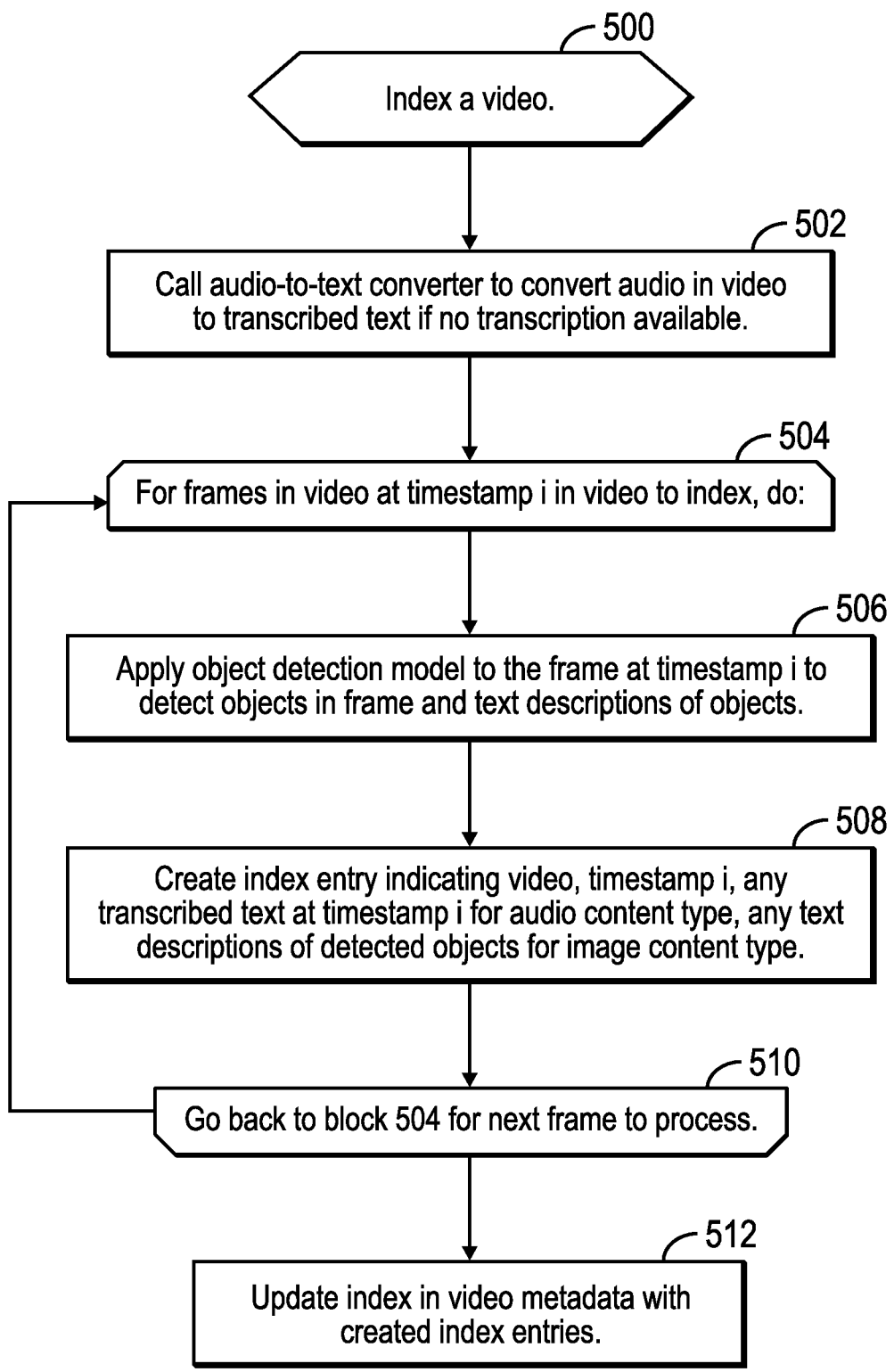
FIG. 5 illustrates an embodiment of operations to index a video for audio and video content within the video.

FIG. 5 illustrates an embodiment of operations performed by the video indexer 108 to index a video 110 from the video database 112. Upon receiving (at block 500) a video 110 to index, the audio-to-text converter 118 converts (at block 502) audio in video 110 to transcribed text 120 of the audio if no transcription is available. A loop of operations is performed at blocks 504 through 510 for frames at timestamps or time offsets in the video 110. After the loop, the indexed information 300$_i$ can be added to the index 300 in the video metadata 116 and be available to search requests. For timestamp I, the video indexer 108 applies (at block 506) the object detection model 122 to the frame at timestamp i to detect objects in the frame and text descriptions of the objects. The video indexer 108 creates (at block 508) an index entry 300$_i$ indicating the video 110, timestamp i, and any matching transcribed text 120 for audio content type at timestamp i and/or, any matching textual labels of detected objects in video 124 for an image content type at timestamp i. Further, if there is any text in the video 110 frame processed, there may be a text content type having the text located in the video 110, such as text shown in the video frame at timestamp i. The index 300 in the video metadata 116 is updated (at block 512) with the created index entries 300$_j$.

With the embodiment of FIG. 5, index entries 300$_i$ are generated to provide searchable text having information on audio and image objects in the video frame at a timestamp in the video 110 to allow users to search video 110 for specific content at timestamps in the video 110 and receive computer addressable links that when selected start playing the video at the timestamp or play point in the video 110 having the content matching the search request 200.

In alternative embodiments, the content instances may include content for other content types extracted from the video 110 at timestamp i, such as images detected and extracted from the video frame, audio extracted from the audio stream at timestamp i, and video extracted at timestamp i of the video to allow searching for search content in formats other than text, such as a search image, search audio, or search video.

Figure 6A:
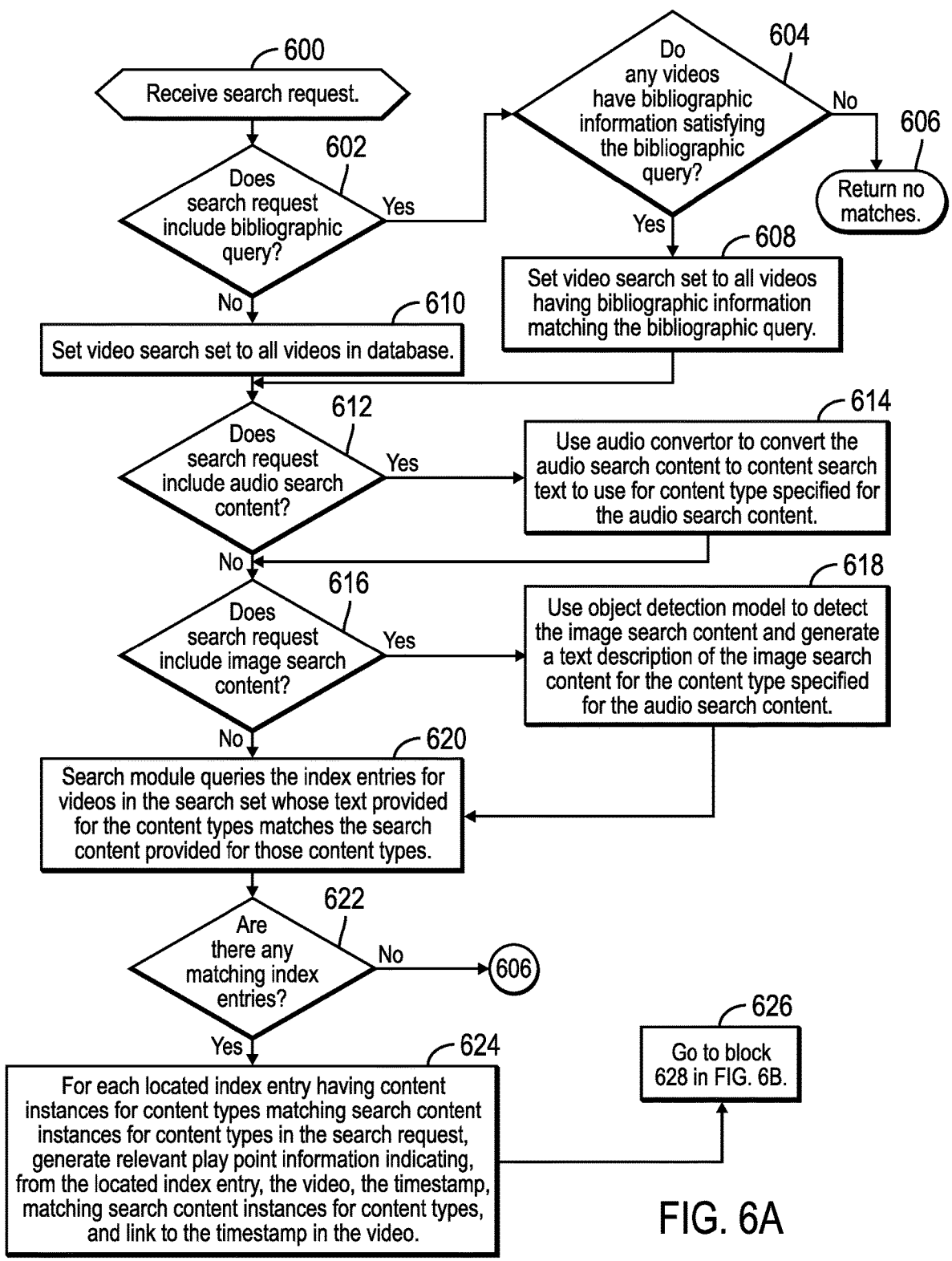
FIGS. 6A and 6B illustrate an embodiment of operations performed to search for content in a video, such as video, images, and audio to return computer addressable links to timestamps in the video where the matching search content is rendered.
Figure 6B:
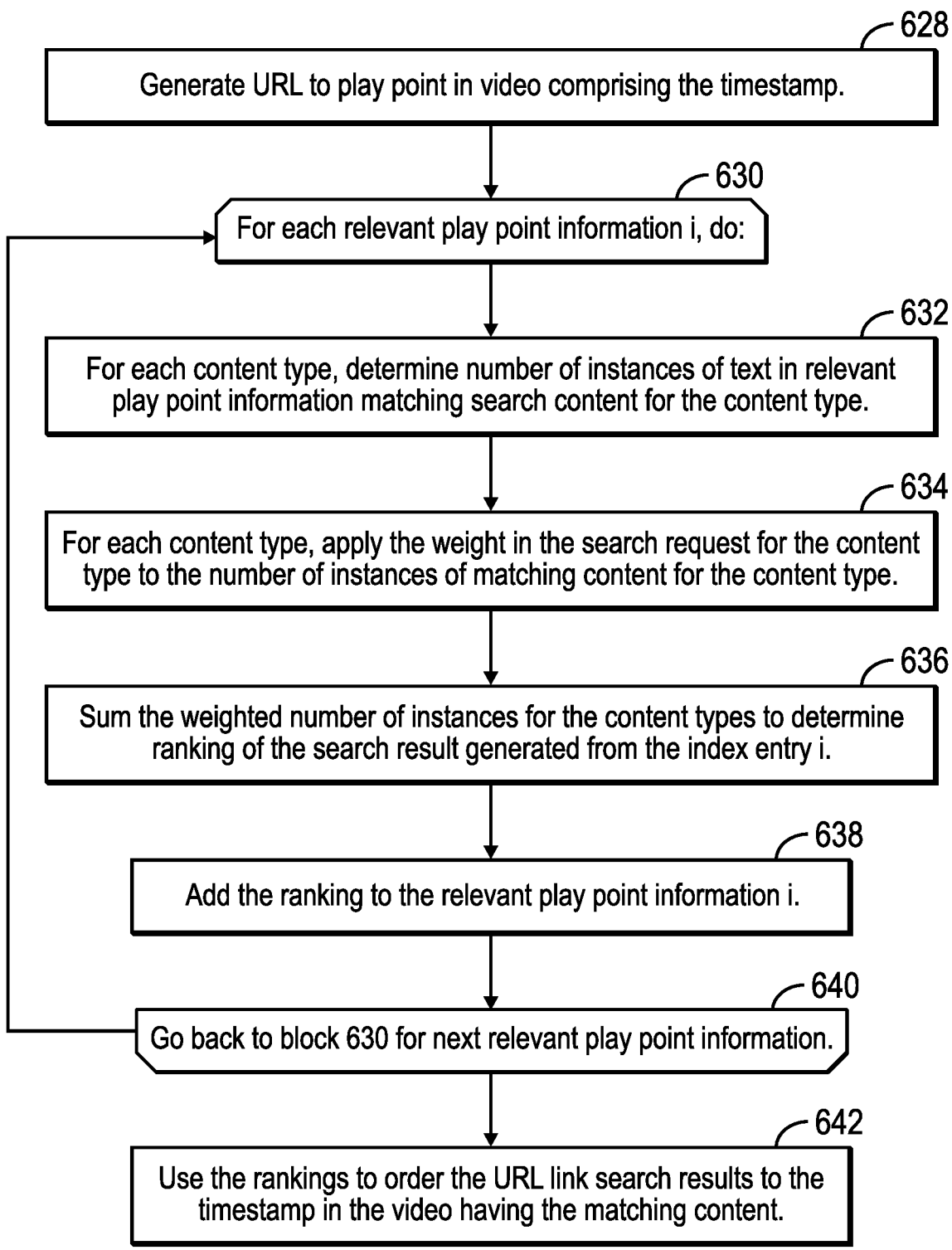

FIGS. 6A and 6B illustrate an embodiment of operations performed by the search manager 126 to identify index entries 300$_i$ in the index 300 matching a search request 200 to generate computer addressable links or URLs having a timestamp in the video with the matching content to allow the user to select the link to start playing the video at the timestamp or play point having the matching content. Upon receiving (at block 600) a search request 200 from a client 100, if (at block 602) the search request 200 includes a bibliographic query 204 and if (at block 604) no videos 112 have bibliographic information 117, including tags, matching the bibliographic query metadata 204, then "no matches" indication is returned (at block 606) to the client 100 initiating the search request 200. If (at block 604) the bibliographic information 117 matches the bibliographic query, then the video search set is set (at block 604) to all videos 112 having bibliographic information 117, including tags, matching the bibliographic query 204. If (at block 602) there is no bibliographic query 204, then the search set comprises all videos 112.

If (at block 612) the search request includes audio search content, then the audio convertor 118 converts (at block 614) the audio search content to content search text to use for the content type specified for the audio search content. From block 614 or from block 612, if (at block 616) the search request includes image search content, then the object detection model 122 is used (at block 618) to detect the image search content and generate a text description of the image search content for the content type specified for the audio search content. From block 618 or the no branch of block 616, control proceeds to block 620 where the search module 134 queries the index 300 for index entries 300; for videos in the search set whose text provided for the content types matches the search content provided for those content types. For instance, if the search request 200 provides search content instances 206 having keywords for a video content type and keywords for an audio content type, then a determination is made of index entries 300, having content instances 308 with content for a content type matching the search content instance 206 for that content type. If (at block 622) there are no matching index entries 300i, then control ends (at block 606)

If (at block 622) there are matching index entries 300i, then the search module 134 or search manager 126 generates (at block 624), for each located index entry 300, having content instances 308 for content types matching search content instances 206, relevant play point information 400; including, from the located index entry 300, the video 304, the timestamp 306, and matching content instances 308 in fields 406, 410, and 408, respectively. Information in other fields of the relevant play point information 400; would also be added, including fields 402 and 404. Control then proceeds (at block 626) to block 628 to generate a URL 412 or other type of addressable link to the video including the timestamp 410, so that when the URL link is selected the video plays from the play point comprising the timestamp 410.

A loop of operations is performed at blocks 630 through 640 to calculate the ranking 412 of the play point URL 414 or search result for each generated relevant play point information 400; for the search request 200. For relevant play point information 400i, the ranking engine 136 determines (at block 632), for each content type, the number of content instances of text in the relevant play point information for the same timestamp matching the search content for the content type. For each content type, the ranking engine 136 applies (at block 634) the weights 208 in the search request for the content types to the number of instances of matching content instances for the content types at the timestamp. The weighted number of instances for the content types are summed (at block 636) to determine the ranking 412 of the play point URL 414 search result. The calculated ranking is added (at block 638) to field 412 of the relevant play point information 400i. Control proceeds (at block 640) back to block 630 for the next relevant play point information 400; to process for the search request 200. The rankings 412 are used (at block 642) to order the play point URL links 414 to present to a user at the client 100 in the ranked order as search results for selection.

With the embodiment of FIGS. 6A and 6B, different content types can be searched in video, such as audio and video, to locate content in the different content types that match search criteria for content of different content types.

The search criteria may further comprise weights for the different content types to use to weight number instances of matching content for the content types in a search result to determine a ranking of the different search results. Further, described embodiments provide computer technology to generate a computer addressable link, e.g., URL link 414, search result that includes a play point timestamp in the link to cause a video player to play the video at the URL link 414 from a timestamp in the vide at which the matching search content is rendered. This allows viewers to directly skip to the sections of the video having matching content.

In further embodiment, the index entries may index different content for the content types, such as content comprising an audio file, image file or a video file at different timestamps of the video. The search modules may then receive search content in the content type, such as an audio file, image file, or video file, and directly compare the received audio file, image file or video file with the indexed content of the same content type. This allows for direct comparison of a received content format, such as audio/image/video, that is used to perform a reverse image/audio/video search to find matching image/audio/video content at different timestamps of the video.

FIG. 7 illustrates an example of a play point table 700 of rows of relevant play point information, captured at different times in a timeline 702. Fields 704/706, 708, 712/714, 716, 718 in FIG. 7 correspond to fields 402, 404, 406, 408/410, and 414 of FIG. 4. Further, the keyword list 710 corresponds to the search content instances 206 in FIG. 2. The play point data rows at times 3, 4, and 5 provide different search content instances at the same timestamp "144 seconds", and all reference the same play point URL 718. Thus, FIG. 7 shows an embodiment where there are separate relevant play point information rows for the same timestamp in the same video for different matching content instances for different content types, text, audio search, image search. In further embodiments, the mapped content 716 may included mapped content for different content instances.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
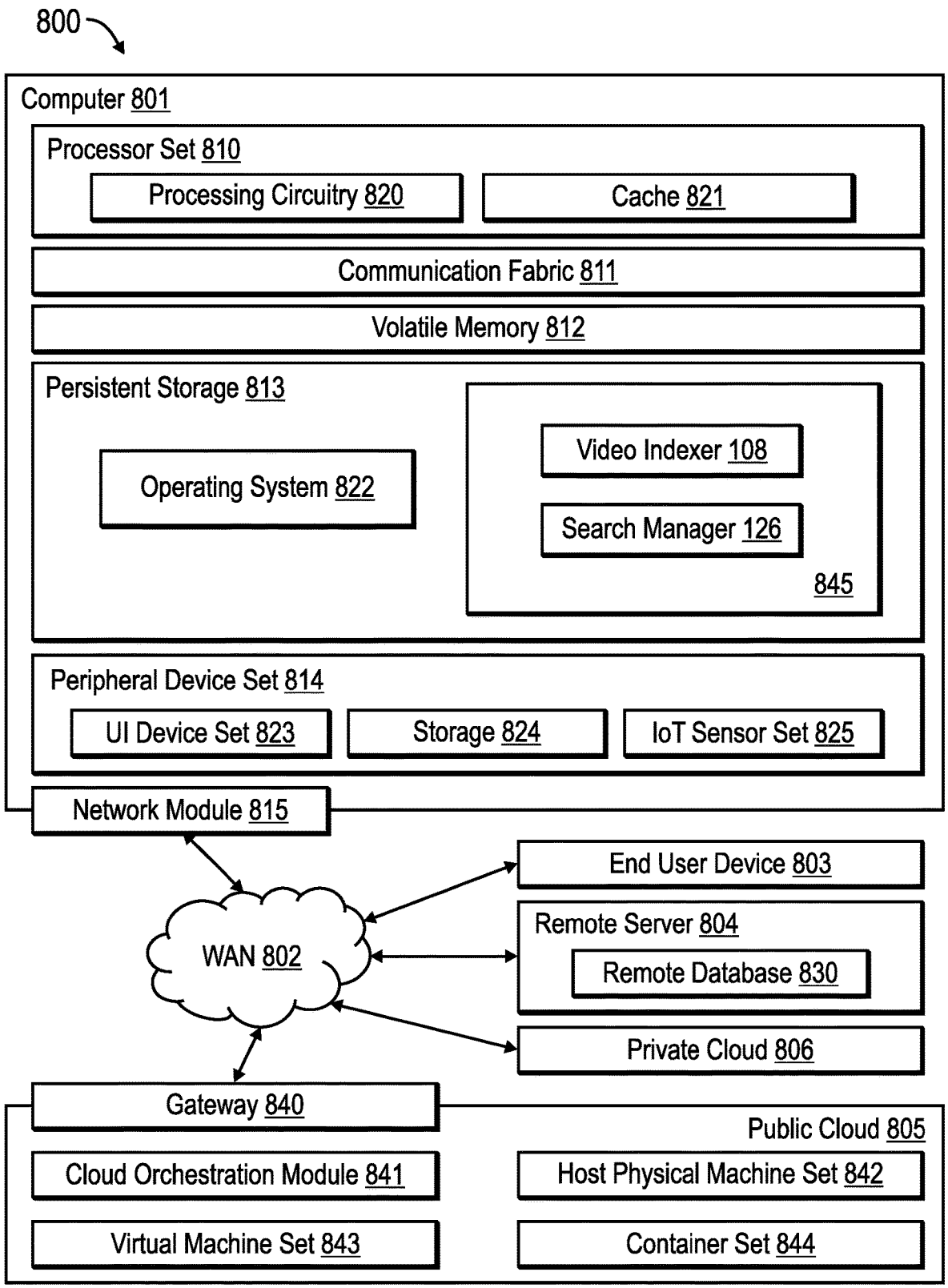
FIG. 8 depicts a computing environment in which the components of FIG. 1 may be implemented.

With respect to FIG. 8, computing environment 800 contains an example of an environment for the execution of at least some of the computer code involved in performing the inventive methods of the video indexer 108 and search manager 126 in block 845. In addition to block 845, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 845, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated. In certain embodiments computer 801 may comprise the play point server 104 of FIG. 1.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 845 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 845 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on. The EUD 803 may comprise the client 100 in FIG. 1 that generates search request 200 to send to the play point server 104.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804. In certain embodiments, the remote database 830 may comprise the videos 112, video metadata 116, and index 300 accessed by the search manager 126 to process search requests.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for searching video content, wherein the computer program product comprises a computer readable storage medium having computer readable program instructions that when executed perform operations, the operations comprising:
   providing an index of content at timestamps of frames in videos;
   receiving a search request with a bibliographic query of bibliographic information to search and search content of content in frames to search;
   determining a search set of videos having metadata including bibliographic information satisfying the bibliographic query;
   determining matching index entries having content in frames of the videos in the search set, associated with timestamps, matching the search content;
   for a matching index entry of the matching index entries for videos in the search set, generating a computer addressable link to a timestamp associated with the matching index entry; and
   returning computer addressable links to the search request, wherein selection of one of the computer addressable links causes the video to play from the frame at the timestamp having content matching the search content.

2. The computer program product or claim 1, wherein the search content comprises at least one of text, audio, and an image, wherein the operations further comprise:
   converting audio in the search content to text in response to the search content including the audio;
   processing, by an image recognition program, an image in the search content to output a text description of the image; and
   wherein the determining the matching index entries having the content in the index matching the search content comprises determining the content in the index having at least one of text, text converted from the audio, and the text description from the image in the search content.

3. The computer program product of claim 1, wherein the search content provides search content for different content types, wherein each matching content in the index has matching content for the different content types in the search content.

4. The computer program product of claim 3, wherein the search request includes weights for the different content types included in the search content, wherein the operations further comprise:
   ranking the computer addressable links by applying the weights for the different content types in the search request to the content in the matching index entries content for the different content types in index entries.

5. The computer program product of claim 1, wherein the determining the matching index entries matching the search content comprises:
   determining the matching index entries in the index matching the search content for at least two videos of the videos, wherein the returning the computer addressable links comprise returning computer addressable links to timestamps associated with the matching index entries for content instances in the at least two videos.

6. The computer program product of claim 1, wherein the operations further comprise:

processing a video to extract text descriptions of content in frames of the video for different content types; and updating the index to associate the extracted text descriptions with timestamps in the video at which the content, from which the extracted text descriptions were derived, was rendered.

7. The computer program product of claim 6, wherein the operations further comprise:

transcribing, by an audio-to-text convertor, an audio stream in the processed video to output transcribed text, wherein the extracted text descriptions comprise the output transcribed text and wherein the timestamps associated with extracted text descriptions comprise timestamps in the video at which audio, from which the output transcribed text is generated, is rendered.

8. The computer program product of claim 6, wherein the operations further comprise:

detecting, by an object detection model, images in frames of the video; and processing, by the object detection model, the detected images to output text descriptions of the detected images, wherein the extracted text descriptions comprise the outputted text descriptions of the detected images and wherein the timestamps associated with the extracted text descriptions comprise timestamps of the frames in the video in which the detected images were detected.

9. A system for searching video content, comprising:

a processor; and a computer readable storage medium having computer readable program instructions that when executed by the processor perform operations, the operations comprising:

providing an index of content at timestamps of frames in videos;

receiving a search request with a bibliographic query of bibliographic information to search and search content of content in frames to search;

determining a search set of videos having metadata including bibliographic information satisfying the bibliographic query;

determining matching index entries having content in frames of the videos in the search set, associated with timestamps, matching the search content;

for a matching index entry of the matching index entries for videos in the search set, generating a computer addressable link to a timestamp associated with the matching index entry; and returning computer addressable links to the search request, wherein selection of one of the computer addressable links causes the video to play from the frame at the timestamp having content matching the search content.

10. The system of claim 9, wherein the search content comprises at least one of text, audio, and an image, wherein the operations further comprise:

converting audio in the search content to text in response to the search content including the audio;

processing, by an image recognition program, an image in the search content to output a text description of the image; and wherein the determining the matching index entries having the content in the index matching the search content comprises determining the content in the index having at least one of text, text converted from the audio, and the text description from the image in the search content.

11. The system of claim 9, wherein the search content provides search content for different content types, wherein each matching content in the index has matching content for the different content types in the search content.

12. The system of claim 11, wherein the search request includes weights for the different content types included in the search content, wherein the operations further comprise:

ranking the computer addressable links by applying the weights for the different content types in the search request to the content in the matching index entries for the different content types in index entries.

13. The system of claim 11, wherein the operations further comprise:

processing a video to extract text descriptions of content in frames of the video for different content types; and updating the index to associate the extracted text descriptions with timestamps in the video at which the content, from which the extracted text descriptions were derived, was rendered.

14. The system of claim 13, wherein the extracting the text descriptions comprises at least one of:

(1) transcribing, by an audio-to-text convertor, an audio stream in the processed video to output transcribed text, wherein the extracted text descriptions comprise the output transcribed text and wherein the timestamps associated with extracted text descriptions comprises timestamps in the video at which audio, from which the output transcribed text is generated, is rendered; and (2) detecting, by an object detection model, images in frames of the video and processing, by the object detection model, the detected images to output text descriptions of the detected images, wherein the extracted text descriptions comprise the outputted text descriptions of the detected images and wherein the timestamps associated with the extracted text descriptions comprise timestamps of the frames in the video in which the detected images were detected.

15. A computer implemented method for searching video content, comprising:

providing an index of content at timestamps of frames in videos;

receiving a search request with a bibliographic query of bibliographic information to search and search content of content in frames to search;

determining a search set of videos having metadata including bibliographic information satisfying the bibliographic query;

determining matching index entries having content in frames of the videos in the search set, associated with timestamps, matching the search content;

for a matching index entry of the matching index entries for videos in the search set, generating a computer addressable link to a timestamp associated with the matching index entry; and returning computer addressable links to the search request, wherein selection of one of the computer addressable links causes the video to play from the frame at the timestamp having content matching the search content.

16. The method of claim 15, wherein the search content comprises at least one of text, audio, and an image, further comprising:
- converting audio in the search content to text in response to the search content including the audio;
- processing, by an image recognition program, an image in the search content to output a text description of the image; and
- wherein the determining the matching content in the index matching the search content comprises determining the content in the index having at least one of text, text converted from the audio, and the text description from the image in the search content.

17. The method of claim 15, wherein the search content provides search content for different content types wherein each matching content in the index has matching content for the different content types in the search content.

18. The method of claim 17, wherein the search request includes weights for the different content types included in the search content, further comprising:
- ranking the computer addressable links by applying the weights for the different content types in the search request to the content in the matching index entries for the different content types in index entries.

19. The method of claim 15, further comprising:
- processing a video to extract text descriptions of content in frames of the video for different content types; and
- updating the index to associate the extracted text descriptions with timestamps in the video at which the content, from which the extracted text descriptions were derived, was rendered.

\* \* \* \* \*